US011141885B2

(12) United States Patent
Hendrix et al.

(10) Patent No.: US 11,141,885 B2
(45) Date of Patent: Oct. 12, 2021

(54) PROCESS FOR MANUFACTURING A PRECURSOR MATERIAL COMPRISING A POLYMER MATERIAL AND A FIBRE MATERIAL

(71) Applicant: SAPPI Netherlands Services B.V., Maastricht (NL)

(72) Inventors: Sandra Hendrix, Maastricht (NL); Wim Ballet, Riemst (BE); Lucile Maletras, Horgen (CH)

(73) Assignee: SAPPI Netherlands Services B.V., Maastricht (NL)

( * ) Notice: Subject to any disclaimer, the term of this patent is extended or adjusted under 35 U.S.C. 154(b) by 0 days.

(21) Appl. No.: 15/781,345

(22) PCT Filed: Dec. 5, 2016

(86) PCT No.: PCT/EP2016/079782
§ 371 (c)(1),
(2) Date: Jun. 4, 2018

(87) PCT Pub. No.: WO2017/097719
PCT Pub. Date: Jun. 15, 2017

(65) Prior Publication Data
US 2018/0361622 A1 Dec. 20, 2018

(30) Foreign Application Priority Data

Dec. 7, 2015 (EP) ...................................... 15198308

(51) Int. Cl.
*B29B 7/90* (2006.01)
*B29B 7/16* (2006.01)
(Continued)

(52) U.S. Cl.
CPC ................ *B29B 7/90* (2013.01); *B29B 7/005* (2013.01); *B29B 7/16* (2013.01); *B29B 7/283* (2013.01);
(Continued)

(58) Field of Classification Search
CPC .. B29B 7/90; B29B 7/16; B29B 7/283; C08K 7/02
See application file for complete search history.

(56) References Cited

U.S. PATENT DOCUMENTS 6,544,447 B1     4/2003   Faerber
6,817,748 B2* 11/2004   Campanelli ............. B29B 7/283
                                                                                                366/76.2
(Continued)

FOREIGN PATENT DOCUMENTS

CN           1106932 C      4/2003
CN      101240096 A      8/2008
(Continued)

OTHER PUBLICATIONS

Densifiers and Recycling, https://wastecare.com/Products-Services/Densifiers/Densifiers-Guide.htm, obtained through a Way Back Machine capture dated Jul. 1, 2014.*
(Continued)

*Primary Examiner* — Nicholas E Hill
(74) *Attorney, Agent, or Firm* — Sughrue Mion, PLLC

(57) ABSTRACT

A process for producing a precursor material comprising the steps of, agitating a polymer material and a fibre material in a blending device comprising a blending means operating at a velocity sufficient to bring about an increase of the temperature to at least a temperature beyond the VI CAT softening point or within or beyond the melting temperature range of the polymer material. Thereafter, maintaining the velocity of the blending means and, when the specific motor
(Continued)

power needed to maintain the velocity of the blending means increases by a predetermined amount or reaches a predetermined value, reducing the velocity. Repeating the previous step as necessary, until the velocity falls below a first threshold value to form an intermediate material. Finally, comminuting the formed intermediate material in a comminuting device comprising a comminuting means operating at a velocity allowing a decrease in temperature, until the temperature falls below a second threshold value.

17 Claims, 1 Drawing Sheet

(51) Int. Cl.
| | |
|---|---|
| *B29B 9/06* | (2006.01) |
| *B29B 9/14* | (2006.01) |
| *B29B 7/74* | (2006.01) |
| *B29B 7/92* | (2006.01) |
| *B29B 7/00* | (2006.01) |
| *B29B 7/28* | (2006.01) |
| *C08K 7/02* | (2006.01) |
| *B29B 9/16* | (2006.01) |
| *B29K 201/00* | (2006.01) |

(52) U.S. Cl.
CPC ............ *B29B 7/7461* (2013.01); *B29B 7/92* (2013.01); *B29B 9/06* (2013.01); *B29B 9/14* (2013.01); *C08K 7/02* (2013.01); *B29B 9/16* (2013.01); *B29K 2201/00* (2013.01)

(56) References Cited

U.S. PATENT DOCUMENTS

| | | | |
|---|---|---|---|
| 8,720,805 B1* | 5/2014 | Koenig | B30B 9/18 241/23 |
| 2003/0228454 A1* | 12/2003 | Barlow | C08L 23/10 428/297.4 |
| 2009/0010094 A1* | 1/2009 | Uemura | B29B 7/183 366/100 |
| 2009/0110833 A1* | 4/2009 | Wright | B29B 9/065 427/299 |
| 2009/0135016 A1* | 5/2009 | Yamaguchi | G01L 5/0071 340/635 |
| 2011/0278754 A1* | 11/2011 | Lehtinen | B29B 7/005 264/40.7 |
| 2013/0301375 A1* | 11/2013 | Stephan | B29B 7/007 366/76.2 |

FOREIGN PATENT DOCUMENTS

| | | |
|---|---|---|
| CN | 101245190 A | 8/2008 |
| CN | 102869484 A | 1/2013 |
| EP | 0712657 A1 | 5/1996 |
| JP | 2011005783 A | 1/2011 |
| WO | WO-2007056839 A1 * | 5/2007 ............ D21B 1/342 |

OTHER PUBLICATIONS

Recy Technologies: "Densifiers (Agglomerators)", XP002766157, Retrieved from the Internet: URL:http://www.ledarecycling.it/menu/densifiers_agglomerators.htm, [retrieved on Jan. 18, 2017].
International Search Report of PCT/EP2016/079782 dated Feb. 10, 2017 [PCT/ISA/210].
Written Opinion of PCT/EP2016/079782 dated Feb. 10, 2017 [PCT/ISA/237].
Translation of Communication issued Oct. 28, 2019, from the State Intellectual Property Office of the P.R.C. in application No. 201680071792.9.
Communication dated Mar. 23, 2020, from the Indian Patent Office in application No. 201817021217.

* cited by examiner

PROCESS FOR MANUFACTURING A PRECURSOR MATERIAL COMPRISING A POLYMER MATERIAL AND A FIBRE MATERIAL

CROSS REFERENCE TO RELATED APPLICATIONS

This application is a National Stage of International Application No. PCT/EP2016/079782, filed Dec. 5, 2016, claiming priority based on European Patent Application No. 15 198 308.7, filed Dec. 7, 2015.

TECHNICAL FIELD

The present invention relates to a process for producing a precursor material for the manufacture of a composite material granulate

PRIOR ART

Wood fiber composites, or cellulose fiber composites, are a class of newly developed polymer composites that benefit from increased use in multiple sectors of industry.

In order to produce large quantities of these newly developed polymer composites, it is preferable to rely on already existing machinery used in the production of other polymer materials, such as extruders, in order to avert capital expenditure to purchase new equipment. The existing compounders are not suited to process both a fibrous cellulose material such as cellulose fluff and a polymer material, when introduced separately into an extruder barrel, since the compounder requires a longer time to manufacture a composite material having a desired quality of dispersion (i.e. fibers in polymer), because the extruder screws are mostly designed to process granulate polymers that become liquid in the barrel and are thus easily blended with other fine, non-filamentous particles. Since however the cellulose fibers have an aspect ratio of more than 5, and do not melt, the mixture of components must be allowed extra residence time in the extruder barrel in order to adequately wet the fibers with polymer matrix and disperse the fibers in the polymer matrix. Since however the bulk density of fibre is low, the through-put of the compounder is then relatively low. Also locally, the initially white cellulose can be burnt due to high temperature and then gives the obtained composite an undesirable brown color and pungent odor, in particular when the cellulose is not free of lignin.

It is therefore desirable to provide a process that allows to produce a composite material of polymer and cellulose fibre in a more efficient manner which improves the through-put of the extruding equipment and allows a better dispersion of fibres within final extruded composite material.

SUMMARY OF THE INVENTION

The present invention provides for a process for producing a precursor material for the manufacture of a composite material granulate, said precursor material comprising a polymer material and a fibre material, said process comprising the steps of, in this order,
a. combining the polymer material and the fibre material to form a preblend;
b. agitating the preblend in a blending device comprising a blending means by operating the blending means at a velocity sufficient to bring about an increase of the temperature of the preblend to at least a temperature beyond the VICAT softening point, or a temperature within or beyond the melting temperature range of the polymer material, c.
   maintaining the velocity of the blending means until the specific motor power needed to maintain the velocity of the blending means increases by a predetermined first amount or reaches a predetermined first value and then reducing the velocity by a predetermined amount;
d. repeating the previous step c. until a final predetermined velocity is reached;
e. maintaining the final velocity of the blending means until the specific motor power needed to maintain the final velocity of the blending means increases by a predetermined second amount or reaches a second predetermined value, thereby forming an intermediate material;
f. comminuting the formed intermediate material in a, preferably cooled, comminuting device comprising a comminuting means by operating the comminuting means at a velocity allowing for a decrease in temperature of the intermediate material, until the temperature falls below a final threshold value, thereby forming the precursor material.

The present invention further provides for a precursor material for the manufacture of a composite material granulate obtained by the process described above, as well as an apparatus having an control unit configured for the production of such precursor material according to the above process.

The present invention further provides also an apparatus for producing a precursor material for the manufacture of a composite material granulate comprising a blending device comprising a blending means and a comminuting device comprising a comminuting means, configured for carrying out the process according to the above.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
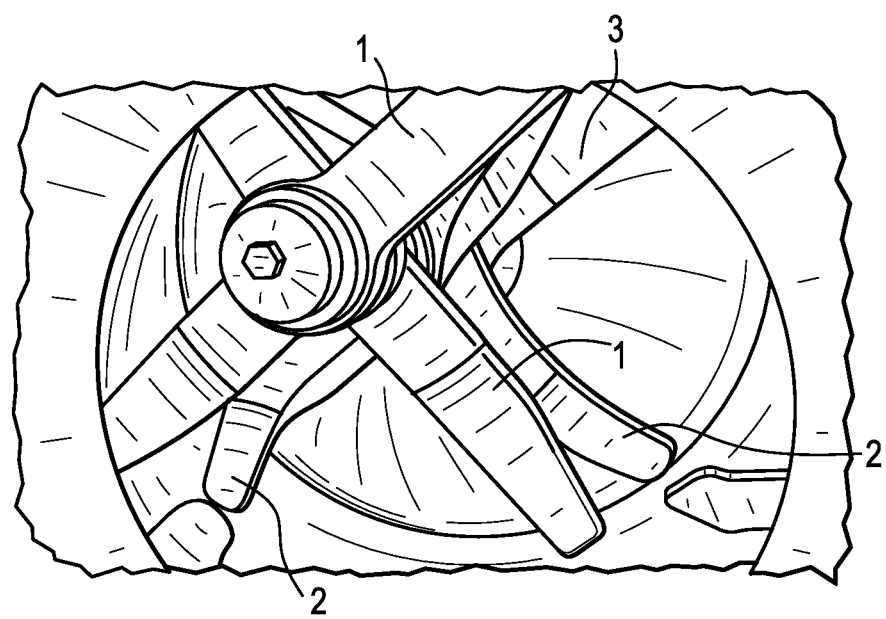
FIG. 1 shows a blending means of the vertical mixer, having in total five blades, i.e. four blending blades (2× straight shape (1), 2× curved shape (2)) and one bottom scraper blade (3), all of which are superposed along the vertical direction.

The present invention provides for a process for producing a precursor material for the manufacture of a composite material granulate, said precursor material comprising a polymer material and a fibre material, said process comprising the steps of, in this order,
a. combining the polymer material and the fibre material to form a preblend;
b. agitating the preblend in a blending device comprising a blending means by operating the blending means at a velocity sufficient to bring about an increase of the temperature of the preblend to at least a temperature beyond the VICAT softening point, or to at least a temperature within or beyond the melting temperature range of the polymer material, c. maintaining the velocity of the blending means until the specific motor power needed to maintain the velocity of the blending means has increased by at least a predetermined first amount or has reached at least a predetermined first value and then reducing the velocity of the blending means by a predetermined amount;

d. repeating the previous step c. until a final predetermined velocity is reached;

e. maintaining the final velocity of the blending means until the specific motor power needed to maintain the final velocity of the blending means increases by a predetermined second amount or reaches a second predetermined value, thereby forming an intermediate material;

f. comminuting the formed intermediate material in a, preferably cooled, comminuting device comprising a comminuting means by operating the comminuting means at a velocity allowing for a decrease in temperature of the intermediate material, until the temperature falls below a final threshold value, thereby forming the precursor material.

In the context of the present invention, the expression "to maintain the velocity" means that the effective velocity does not deviate from the set velocity by more than 10%, preferably 5%.

In the context of the present invention, the expression "lignin-free" means having less than 1% lignin by weight.

In the context of the present invention, the expression "(co) polymers" means copolymers or homopolymers.

In the context of the present invention, the expression "specific motor power" means the motor power per unit weight of material, such as for example the motor power per unit weight of preblend in step b.

In the context of the present invention, the expression "fibrous cellulosic material" means a fibre material comprising cellulose in the form of loose cellulose fibres or cellulose fiber bundles. Exemplary forms are loose-fill cellulose or dried fluff pulp.

In the context of the present invention, the expression "VICAT softening point" means the temperature at which a flat-ended needle with a 1 mm$^2$ circular cross-section penetrates a specimen of the polymer material to a depth of 1 mm according to ASTM D 1525B.

The present invention thus essentially provides for a process for producing a precursor material for the manufacture of a composite material granulate, in which in a first step of the process, a raw material such as polymer material and a fibre material are heated mainly because of the friction between the raw material particles, created by the agitation of the raw materials in the blending device using the blending means, until the polymer material partly and/or locally softens or melts and wets the fibre material, thus creating agglomerates of the polymer and fibre materials. In addition to allow the polymer material and cellulose material to combine, the generated heat also allows to release the residual moisture that may be present in the fibre material and/or the polymer. In a second step of the process, the intermediate material which is formed of smaller and larger agglomerates is comminuted in a suitable, usually cooled, device in order to break up the larger agglomerates and coalesce smaller agglomerates such as to yield a precursor material having a narrower particle size distribution. Even if the fibrous cellulose material is not always uniformly dispersed throughout the polymer, the formed precursor material of the present invention can conveniently be fed via a hopper into the extruder barrel, where the polymer material in the precursor material is fully melted and this melt is subsequently pelletized to yield the final composite material granulate having an enhanced dispersion of fibre material in the polymer material matrix. In other words, the process of the invention allows to at least partially prewet the cellulose material with the polymer before the actual extrusion into composite pellets ready for subsequent moulding processing takes place.

The blending device comprising a blending means can be any device capable of agitating the polymer material and fibre material through its blending means such that the friction between polymer material, fibre material and the blending means causes the temperature of at least part of the polymer material to rise beyond its VICAT softening point, or preferably to a temperature within or beyond its melting temperature range. In the case of polyolefins such as polypropylene or polyethylene (co)polymers, and in particular in the case of polypropylene or polyethylene (co)polymers having an MFI of between 10 and 100, the temperature within or beyond the melting temperature range of the polymer material will be a temperature between 120° C. and 180° C.

The polymer material may be in the form of pellets or powders, and may be either virgin polymer or recycled polymer. The polymer material may come pre-compounded with additives, colorants, lubricants or any other additional component useful in the process of the present invention.

The precursor material obtained according to the process of the present invention is suitable for the manufacture of a composite material granulate. Composite material granulates are commonly referred to as composite material pellets and constitute the preferred form of polymer for transport and further processing into molded articles.

In a preferred embodiment, the polymer material of the process of the present invention comprises, or consists of, one or more synthetic polymers such as condensation or addition polymers and advantageously comprises, or consists of one or more polyolefins, preferably thermoplastic polyolefins such as polypropylenes or polyethylenes (co) polymers. In particularly preferred embodiment, the polymer material of the process of the present invention comprises, or consists of one or more polypropylenes or polyethylenes having an MFI of between 10 and 100 when measured at 230° C. using a 2.17 kg load according to ASTM D1238. An exemplary polypropylene grade is Sabic PP512MN10 polypropylene block copolymer having an MFI 37 and a density of 905 kg/m$^3$. Polymers having a too low, i.e. below 10, melt flow index become hard to process in the blending device since the viscosity tends to be so high that fibres will not transition into the polymer matrix to be wetted.

In yet another preferred embodiment, the second predetermined amount or value of step. e is larger than the predetermined first amount or value of step c., and in particular is of from 1.1- to 2-fold larger, preferably 1.5 to 2-fold larger, than the predetermined first value of step c.

In another preferred embodiment, in the process of the present invention the velocity sufficient to increase the temperature of the polymer material in the preblend corresponds to a blade tip velocity of from 8 m/s to 69 m/s, preferably of from 25 to 52 m/s, more preferably of from 30 to 39 m/s. Generally speaking, the higher the velocity, the quicker the polymer material and the fibre material of the preblend will heat up and start to combine as desired. However above a certain velocity, the blades of the blending means will locally heat up to a temperature that causes the polymer or fibre material to thermally decompose on the blade surface, which is undesirable.

In another preferred embodiment, in the process of the present invention the fibre material has preferably a residual water content of less than 15%, and preferably is further essentially free of lignin. Residual water may slow down the process and damage water-sensitive polymers such as most condensation polymers through hydrolysis of the polymer backbone, which is why the polymer material as well as the fibre material should be either dried previously or simultaneously in the blending device.

In another preferred embodiment, in the process of the present invention, the blending device is a vertical mixer and the blending means is the type of bladed agitator commonly used in the hot stage of PVC mixing devices. An exemplary vertical mixer is the Turbomixer TMX or the Techno SRL-Z100. The mixing means may be for example impellers or propellers having a plurality of blades, the one or more impellers or propellers being aligned in vertical direction. The one or more propellers or impellers may be of the same shape or of different shapes, such as for example a combination of two identical shapes and one different shape. An exemplary blending means is illustrated in FIG. 1.

The blending device may be be equipped with a heating and/or cooling means that allows to actively heat/cool the precursor material such as for example an oil jacket lining the inner wall surface of the blending device.

Optionally, the blending device may also be equipped with a chopper or a deflector means to help achieve an effective agitation of the materials of the preblend.

In another preferred embodiment, in the process of the present invention, the comminuting device is a horizontal mixer such as a single- or twin-shaft horizontal paddle mixer or ribbon mixer. The comminuting device serves the purpose of allowing the formed intermediate material to cool down and for coalescing the smaller particle into larger particles of a predetermined size such as to form a precursor material. When present, choppers serve the purpose of breaking up larger lumps of precursor material into smaller particles of as predetermined size to aid the coalescing. The comminuting device may be equipped with a cooling means that allows to actively cool the intermediate material, such as for example a water jacket lining the inner wall surface of the comminuting device. An exemplary comminuting device is the Promixon Horizontal Cooler CMX.

In another preferred embodiment, in the process of the present invention, in step c., the velocity is reduced by for example 20, 25, 33 or 50% (with respect to the initial velocity sufficient to bring about an increase in temperature of step b.), which then allows to reach the final velocity of step d., within a limited number of repetitions of step c. The iterative reduction of the velocity according to step c. in conjunction with step d. allows for the formation of an intermediate material that can be easily isolated from the blending device, since if the velocity is not thus reduced during the process, the polymer material and the fibrous material will combine to form one single mass/clump of compound that clings to the blades of the blending means and which cannot easily be detached from the blades or expelled from the blending device, even when in a plastic state and even more so in a hardened state. The stepwise, iterative decrease thus allows dosing and adapting the energy that is conveyed to the materials of the preblend to avoid complications in the overall process. Another possibility to steer the speed reduction is using the torque control of the device by keeping the torque at a certain level e.g. 25% max motor power (this will lead to a continuous, instead of stepwise speed reduction).

In another preferred embodiment, in the process of the present invention, in step c., the velocity is reduced by a predetermined amount when the specific motor power needed to maintain the velocity of the blending means increases 2 to 40 percent, preferably by 10 to 30 percent, more preferably by 15 to 25 percent.

In another preferred embodiment, in the process of the present invention, the fibre material is bleached and/or lignin-free cellulose. The fibre material may be used in the process of the present invention in the form of a fluffed bleached and/or lignin-free cellulose, having a bulk density of 90 g/L that can be prepared from dry pulp sheets.

An exemplary process to prepare fluffed bleached and/or lignin-free cellulose is by transporting dry pulp sheets into the cutting chamber of a knife mill by means of profiled draw-in rollers. A size reduction to the desired end size is performed between the stator- and rotor knives in the housing. The final fineness is determined among others by the speed of the rotor and the type of screen insert. An advantageous fineness can be reached by screening out fluff through a 200 μm screen.

The present invention further provides a precursor material for the manufacture of a composite material granulate obtained by the process described above.

In a preferred embodiment, the precursor material for the manufacture of a composite material granulate obtained by the process described above, comprises of from 2 to 64 weight percent of fibre material and of from 35 to 97 weight percent of polymer material, the weight percent being based on the total weight of the precursor material. Preferably, the composite material granulate obtained by the process described above, comprises of from 40 to 63 weight percent of polymer material and of from 35 to 58 weight percent of fibre material, the weight percent being based on the total weight of the precursor material. Below a too low, i.e. below 2, weight percent of fibre material, the resulting intermediate material form a single mass clinging to the blades of the comminuting means, since there is not enough cellulose surface to limit the molten polymer surface to stick and form large agglomerates, whereas a too high, i.e. above 64, weight percent of fibre material, the wetting of the fibre surface with polymer is insufficient. A too high content of cellulosic material leads to higher temperatures in the blending device which can also lead to a partial darkening of the intermediate product and/or composite material granulate because the cellulose material starts browning, i.e. decomposing.

In a preferred embodiment, the precursor material for the manufacture of a composite material granulate obtained by the process described above further comprises a coupling agent, preferably of from 0.5 to 10 weight percent of a coupling agent, and more preferably of from 2 to 5 weight percent of a coupling agent, the weight percent being based on the total weight of the precursor material.

In a preferred embodiment, the precursor material for the manufacture of a composite material granulate obtained by the process described above, the coupling agent is MAPP (maleic anhydride grafted polypropylene) or MAPE (maleic anhydride grafted polyethylene). The coupling agent forms covalent bonds via esterification with celluloses and allows for better mechanical stability of the final composite that may be obtained by processing the precursor material.

In a preferred embodiment, the precursor material for the manufactures of a composite material granulate obtained by the process described above further comprises a lubricant. In particular the lubricant may be of from 0.5 to 5 weight percent, the weight percent being based on the total weight of the precursor material.

In a preferred embodiment, the precursor material for the manufacturing of a composite material granulate obtained by the process described above is in particulate form, preferably in a free-flowing particulate form.

In a much preferred embodiment, the precursor material comprises a about 35 to 64 weight percent polypropylene, about 35 to 60 weight percent lignin-free cellulose and preferably further 1 to 5 weight percent of MAPP; and the preblend of polymer material, coupling agent, and fibre material are agitated in a vertical mixer comprising a blending means by operating the blending means at a tip velocity of from 30 to 39 m/s to bring about an increase of the temperature to about 155° C. to 175° C. in the preblend, and in which the tip velocity of the blending means is maintained until the specific motor power needed to maintain the tip velocity of the blending means increases by about 10 to 50%, and then the tip velocity of the blending means is reduced by about 10 to 35%; and the thus set tip velocity is maintained until the specific motor power increases again by the same amount and the tip velocity is again reduced. This is repeated until the final tip velocity of 4 m/s to 19 m/s is reached and the final tip velocity is maintained until the specific motor power to maintain the final tip velocity again increases by an amount that is preferably larger than 10 to 50%. At this time the formed intermediate blend is dumped in to a cooled, horizontal mixer, where the intermediate blend is comminuted and preferably also chopped in a cooled, horizontal mixer comprising a comminuting means, and optionally a chopping means, by operating the comminuting means at a tip velocity of from 3 to 8 m/s until the temperature falls below temperature at least lower than 40 to 50° C., thereby forming the precursor material.

The present invention further provides also an apparatus for producing a precursor material for the manufacture of a composite material granulate comprising a blending device comprising a blending means, the velocity of said blending means being set and controlled by a first velocity control unit, said unit being capable of being controlled by a computer-controlled central control and providing velocity and power consumption readings to said computer-controlled central control unit, said computer-controlled central control unit being configured to execute a program for carrying out the process according to the above depending on the readings received from the first velocity control unit. The apparatus for producing a precursor material for the manufacture of a composite material granulate may further comprise a comminuting device comprising a comminuting means.

EXAMPLES 57 kg of polypropylene (PP 512MN10, available from SABIC), 3 kg of MAPP coupling agent (Priex 20098, available from Addcomp) and 40 kg of fibre material (TCF bleached, beech sulphite pulp, available from SAPPI and subsequently milled with a precision knife mill Type PSC, available from Pallmann) were introduced into the vertical portion of an MTI M 400/K 1600 mixer.

Figure 2:
FIG. 2 shows a sample of precursor material for the manufacture of a composite material granulate (4).

The mixer was set to an initial velocity of 34.2 m/s, which corresponded to angular velocity of 800 rpm, and started. As temperature of the blend increased over time, the specific motor power required to maintain 34.2 m/s was first constant until a temperature of about 155° C. was registered, at which time the specific motor power needed to maintain 34.2 m/s rose, and when a specific motor power of 0.55 kW/kg was reached, the mixer was set to a velocity of 25.6 m/s which corresponded to angular velocity of 600 rpm, and the specific motor power needed to operate the mixer also immediately decreased. Once the specific motor power needed to operate the mixer at a velocity of 25.6 m/s reached 0.55 kW/kg, the mixer was set to a velocity of 17.1 m/s which corresponded to angular velocity of 400 rpm, and the specific motor power needed to operate the mixer also immediately decreased below 0.55 kW/kg. Once the specific motor power needed to operate the mixer at a velocity of 17.1 m/s reached 0.55 kW/kg, the mixer was set to a velocity of 8.5 m/s which corresponded to angular velocity of 200 rpm, and the torque needed to operate the mixer also immediately decreased. The velocity was kept until again the specific motor power needed to operate the mixer at a velocity of 8.5 m/s reached 0.88 kW/kg at which time the material was ejected through a side outlet of the vertical mixer into a horizontal mixer MTI Flex-line/K1600. Once the material was fully discharged into the horizontal mixer portion, the vertical mixer is shut down and the horizontal mixer, equipped with a built-in cooling jacket, is operated at a velocity of 8 m/s which corresponded to angular velocity of 90 rpm and the two choppers to angular velocity of 3000 rpm until the temperature of the material is about 70° C. Then, the choppers were stopped and then the blend is discharged once temperature reaches 50° C. and the mixer is switched off. The isolated material which corresponds to the one variety of precursor material according to the invention was in free-flowing particulate form, had a bright white aspect and is shown in FIG. 2.

| List of Reference Signs | |
|---|---|
| 1   straight type blending blade | manufacture of a composite |
| 2   curved type blending blade | material granulate |
| 3   scraper blade | |
| 4   precursor material for the | |

The invention claimed is:

1. A process for producing a precursor material for the manufacture of a composite material granulate, said precursor material comprising a polymer material and a fibre material, said process comprising the steps of, in this order:
   a. combining the polymer material and the fibre material to form a preblend;
   b. agitating the preblend in a blending device comprising a blending means by operating the blending means at a velocity sufficient to bring about an increase of the temperature of the preblend to at least a temperature above the VICAT softening point, or to at least a temperature within or above the melting temperature range of the polymer material;
   c. maintaining the velocity of the blending means until the specific motor power needed to maintain the velocity of the blending means has increased by at least a predetermined first amount or has reached at least a predetermined first value and then reducing the velocity of the blending means by a predetermined amount;
   d. repeating the previous step c until a final predetermined velocity is reached;
   e. maintaining the final velocity of the blending means until the specific motor power needed to maintain the final velocity of the blending means increases by a predetermined second amount or reaches a second predetermined value, thereby forming an intermediate material formed of smaller and larger agglomerates of intermediate material; and f. comminuting the formed intermediate material in a comminuting device by operating the comminuting device at a non-zero velocity allowing for a decrease in temperature, until the temperature of the intermediate material falls below a final threshold value, to break up larger agglomerates of intermediate material and coalesce smaller agglomerates of intermediate material, thereby forming the precursor material.

2. The process according to claim 1, wherein the polymer material comprises a polyolefin having an MFI of between 10 and 100.

3. The process according to claim 2, wherein the polyolefin is a polypropylene or polyethylene polymer.

4. The process according to claim 2, wherein in step b., the velocity sufficient to bring about an increase of the temperature of the preblend corresponds to a blade tip velocity of from 8 m/s to 69 m/s.

5. The process according to claim 2 wherein the blending device is a vertical mixer and the blending means is a bladed agitator.

6. The process according to claim 2 wherein the comminuting device is a single- or twin-shaft horizontal mixer.

7. The process according to claim 2, wherein the velocity at which the blending means are operated is reduced by a predetermined amount when the specific motor power needed to maintain the velocity of the blending means has increased 2 to 40 percent.

8. The process according to claim 2, wherein the fibre material is a bleached or lignin-free cellulose fibre.

9. The process according to claim 1, wherein in step b., the velocity sufficient to bring about an increase of the temperature of the preblend corresponds to a blade tip velocity of from 8 m/s to 69 m/s.

10. The process according to claim 9, wherein the blade tip velocity is from 25 to 52 m/s.

11. The process according to claim 9, wherein the blade tip velocity is from 30 to 39 m/s.

12. The process according to claim 1 wherein the blending device is a vertical mixer and the blending means is a bladed agitator.

13. The process according to claim 1 wherein the comminuting device is a single- or twin-shaft horizontal mixer.

14. The process according to claim 1, wherein the velocity at which the blending means are operated is reduced by a predetermined amount when the specific motor power needed to maintain the velocity of the blending means has increased 2 to 40 percent.

15. The process according to claim 14, wherein the velocity at which the blending means are operated is reduced by a predetermined amount when the specific motor power needed to maintain the velocity of the blending means has increased 10 to 30 percent.

16. The process according to claim 14, wherein the velocity at which the blending means are operated is reduced by a predetermined amount when the specific motor power needed to maintain the velocity of the blending means has increased 15 to 25 percent.

17. The process according to claim 1, wherein the fibre material is a bleached or lignin-free cellulose fibre.

* * * * *